United States Patent [19]
Wilson, Sr. et al.

[11] Patent Number: 5,901,475
[45] Date of Patent: *May 11, 1999

[54] CONTAINMENT AREA PROCESS

[75] Inventors: John M. Wilson, Sr.; Dean R. Wilson, both of Marrero, La.

[73] Assignee: Wilco Marsh Buggies & Draglines, Inc., Marrero, La.

[*] Notice: This patent issued on a continued prosecution application filed under 37 CFR 1.53(d), and is subject to the twenty year patent term provisions of 35 U.S.C. 154(a)(2).

[21] Appl. No.: 08/708,648

[22] Filed: Sep. 5, 1996

Related U.S. Application Data

[60] Provisional application No. 60/018,761, May 31, 1996.

[51] Int. Cl.[6] ....................................................... E02F 3/60
[52] U.S. Cl. .............................................................. 37/195
[58] Field of Search ............................ 37/195, 308, 310, 37/320, 323, 329, 330, 309, 341, 401; 405/21, 163, 164; 210/170, 241, 701

[56] References Cited

U.S. PATENT DOCUMENTS

| | | | |
|---|---|---|---|
| 1,034,501 | 8/1912 | Peterson | 37/309 |
| 4,184,958 | 1/1980 | Manchak, Jr. | 210/170 |
| 4,545,139 | 10/1985 | Langner | 37/195 X |
| 4,731,941 | 3/1988 | Beatty | 37/195 X |
| 4,818,390 | 4/1989 | Manchak, Jr. | 210/170 |
| 5,040,900 | 8/1991 | Boggs | 37/195 X |
| 5,042,178 | 8/1991 | Dutra | 37/195 X |
| 5,250,199 | 10/1993 | Haag | 210/803 |

OTHER PUBLICATIONS

Undated Document entitled "Wilco Marsh Buggies, Inc. Experts in De–Watering and Disposal Area Construction". (No Date).

*Primary Examiner*—Thomas B. Will
*Assistant Examiner*—Robert Pezzuto
*Attorney, Agent, or Firm*—Shawn Hunter; Conley, Rose & Tayon, P.C.

[57] ABSTRACT

Effective techniques and equipment are described for maintaining and improving dredge disposal sites. In one aspect, the use of winching equipment is described to move a digging vehicle within a containment area for effective creation of ditching to permit substantial dewatering and drainage of the dredge spoil to dry it. Substantially dried spoil is removed from the containment area pit using amphibious scraper equipment. The substantially dried spoil may then be used to build up the berm surrounding the dredge pit.

12 Claims, 10 Drawing Sheets

CONTAINMENT AREA PROCESS

This application is a continuation of Provisional application No. 60/018,761, filed May 31, 1996.

BACKGROUND OF THE INVENTION

1. Field of the Invention

The present invention relates to methods and apparatus for maintenance and improvement of dredge disposal containment areas. In one particular aspect, the invention relates to methods and apparatus for constructing ditching in low ground pressure areas such as containment areas for dewatering and drying of spoil. In another particular aspect, the invention relates to methods and apparatus for removing the dried spoil from the containment area.

2. Description of the Related Art

Dredge disposal or containment areas are located throughout the United States for the disposal of dredge spoil which has been dredged from waterways or spent ore or waste from mining operations. This spoil is classified as hazardous by the EPA since, for example, the sludge dredged from waterways contains oil and other heavy metals which have sunk to the bottom of the waterway. Since this spoil has been classified as hazardous waste and because the land used for a containment area thereafter becomes unusable for any other purpose, no new containment areas are currently being built for the disposal of this spoil. Thus, maximum utilization of existing containment areas is required.

Containment areas may be of various sizes and are generally oval shaped. Generally, a containment area includes a levy which extends around the perimeter of the containment area with the crown of the levy being well above the containment area for the spoil. The levy starts out maybe only a few feet high. Then, as spoil material in the containment area is dried, the dried spoil is removed and added to the top of the levy, raising its height and providing for additional space in the containment area for additional spoil. Typically the top of the levy is flat and about 10–12 feet wide so that a vehicle can drive on the levy. On the inside of the levy there is a berm or work shelf which then slopes down into the pit or into a large ditch which has been dug around the perimeter of the containment area inside the levy. The berm may be 30 to 50 feet wide.

The containment area is typically sloped such that one end is higher than the other end. As the spoil is transported into the containment area, such as through a discharge pipe, the solids drop first into the higher end of the containment area with the fines flowing to the lower end of the containment area. Often the containment area has a two foot drop from one end to the other.

One or more weirs are located in the perimeter ditch to allow the run off of the water draining from the spoil. The weirs typically include four vertical I-beams having horizontal boards extending between the vertical supports. Typically the boards of the weirs are three inches thick and forty-eight inches long. Boards are added to the weir as the level of the containment area is raised through the addition of more spoil thus allowing the water to run over the top boards and into the weir. The weirs are of different sizes depending upon the amount of anticipated water volume. A ditch or run off pipe communicates with the weir to allow the water to flow or be pumped to an adjacent area such as, for example, a river. There may be as many as five pipes carrying water from each weir.

The containment area also includes interior ditches extending across the width of the containment area generally on 50 foot centers. These interior ditches are sloped in the direction of the perimeter ditch to drain the water into the perimeter ditch. Because they cross the pit of the containment area, the interior ditches have proven difficult to construct.

Digging vehicles are used currently to dig the interior ditches and these vehicles include rotary ditchers which dig various width ditches, such as three or six foot wide ditches. The blades of the rotary ditchers have hard steel teeth and rotate at approximately 270 rpms. As the digging vehicle digs an interior ditch, the spoil being removed from the ditch is thrown up to 150 feet on each side of the ditch so as not to obstruct the water drainage into and down the ditch.

The pit of the containment area is difficult for equipment to operate in because the spoil is pumped into the containment area is in the form of a slush or sludge which provides little or no ground support. After being removed from a river or other body of water where it has remained under pressure, the spoil tends to expand and absorb and hold water. Typically, the ground pressure of the spoil in the containment area for supporting the digging vehicle is in the range of 0.3 psi to 1.0 psi. The containment area may have a depth of up to 50 or 60 feet of this slush or sludge. Since the spoil essentially provides no ground pressure to support a vehicle, specially designed digging vehicles must be used for digging the interior ditches. Typically, a digging vehicle weighs approximately 30,000 pounds and includes some type of flotation for moving across the water suspended spoil which provides some limited buoyancy because of the water in the spoil. Digging vehicles used in digging interior ditches across containment areas are manufactured by the Dondi Corporation or the Moletti Corporation, both of Italy, or the John Deere Company. Some of these vehicles use rubber flotation tires while others use continuous tracks. The rubber tired vehicles typically include six to eight foot diameter flotation tires. These tires permit the digging vehicle to remain "afloat" in the spoil, but, unfortunately, they do not provide sufficient traction in wet spoil so that ditches can be dug.

One currently practiced method for digging the interior ditches includes setting up the digging vehicle adjacent one side of the containment area and hooking a cable onto the digging vehicle. The other end of the cable is attached to a bulldozer with the cable extending around a deadman or pulley located on the opposite side of the containment area from the digging vehicle. The cable is not wound onto a spool but is dragged around the containment area behind the bulldozer. The bulldozer then drives along the crown of the levy pulling the digging vehicle across the containment area as it digs an interior ditch. In this method, it is preferred that one long continuous cable be used since the connection for two sections of cable may not pass through the deadman pulley. Thus, it is preferred to have a cable which is at least as long as the distance across the containment area. If the cable breaks, it is necessary to attach the ends of the cable such that the connection will pass through the deadman pulley.

This procedure is very slow and labor intensive. The long cable must be dragged around the containment area by the bulldozer and each time properly aligned with the new interior ditch to be cleaned or dug. Each time a new ditch is to be dug, it is necessary to lay out the cables along the top of the levy and across the containment area.

In pulling the digging vehicle across the containment area to dig an interior ditch, the digging vehicle is pulled with a slow, steady constant movement. The operators of the digging vehicle and bulldozer have radios allowing them to communicate and control the speed of the digging vehicle as it is pulled. The speed of the digging vehicle depends upon the consistency of the spoil in the containment area through which the interior ditch is being dug. If the spoil is very soft, the ditch can be cut faster where if the spoil has been allowed to dry and crust over, it is necessary that the digging vehicle be pulled at a slower speed.

The amount of line pull on the cable which is required to pull one of the digging vehicles across the containment area is determined by the weight of the digging vehicle and the drag created by the digging operation. The digging vehicle sinks into the spoil such that a wall of sludge and slush is pushed in front of the digging vehicle as it is pulled across the containment area. Often, the amount of line pull on the cable required to pull the digging vehicle across the containment area is in the range of 40,000 to 60,000 pounds.

Attempts have been made in the past to use hydraulic winches to pull the digging vehicle across the containment area. These attempts have largely been unsuccessful. A hydraulic winch is set at a torque level based on release valves, the amount of hydraulic flow (gpm) and the psi of the pump. The hydraulic winch also is regulated by a series of slip connections floating in oil. These combined create the line pull tonnage of the hydraulic winch. The hydraulic motor is connected directly to the shaft of the spool for the cable. Once the hydraulic winch reaches a certain amount of torque, there is a bypass. However, the torque designed for the hydraulic winch can easily be exceeded in pulling the digging vehicle such that the bypass may not be affected.

Hydraulic winches are rated by the tons of line pull on the first wrap of the cable around the spool. The first wrap of the cable might have 5 tons of line pull but every time a wrap of cable is added to the spool, the amount of line pull decreases. It has been observed that a ½ inch cable wrapped on the spool of a hydraulic winch was not strong enough to pull a ditching vehicle across the containment area and would often break. Thus, it was necessary to use a 9/16 inch cable. The spool of the hydraulic winch would only accommodate approximately 800 feet of 9/16 inch diameter cable. However, each additional wrap on the spool reduced the line pull of the hydraulic winch. One such hydraulic winch was used by ARDCO, now Pettibone, of Houston, Tex., (713) 433-6751 and was mounted on a rubber tired vehicle.

Because hydraulic winches lose torque as more wraps of cable are added to the spool, it was necessary to use multiple sections of cable limited to what the winch could carry (typically on the order of 500 feet) so that only one cable section would be wrapped onto the spool of the winch at one time to ensure that there was sufficient torque to pull the digging vehicle across the containment area. Using this method, the winch spool only accommodates a few hundred feet of cable and then the cable has to be unhooked from the winch, respooled onto a separate spool, and then a new section of cable rehooked again to the winch spool to pull that cable section onto the spool. This procedure is cumbersome, requires a separate spool for the cable, and oftentimes does not have sufficient torque to pull the digging vehicle across the containment area.

For further information on spoil disposal and crust management of spoil, see the attached document entitled "Wilco Marsh Buggies, Inc.: Experts in De-Watering and Disposal Area Construction" incorporated herein by reference.

In some large containment areas, the width of the containment area pit may be two miles. It can be appreciated that a hydraulic winch has difficulty in accommodating 12,000 feet of cable to handle this large distance. There is no known hydraulic winch which is capable of providing 60,000 lbs. of line pull using 12,000 feet of cable.

SUMMARY OF THE INVENTION

The present invention overcomes the deficiencies of the prior art and provides effective techniques for maintaining and improving dredge disposal sites. In one aspect, the invention teaches the use of winching equipment to move a digging vehicle within a containment area for effective creation of ditching to permit substantial dewatering and drainage of the dredge spoil to dry it. In another aspect, the invention teaches removal of substantially dried spoil from the containment area pit using amphibious scraper equipment. The substantially dried spoil may then be used to build up the berm surrounding the dredge pit.

BRIEF DESCRIPTION OF THE DRAWINGS

For a detailed description of a preferred embodiment of the invention, reference will now be made to the accompanying drawings and photographs wherein.

BRIEF DESCRIPTION OF THE PREFERRED EMBODIMENTS

Figure 1:
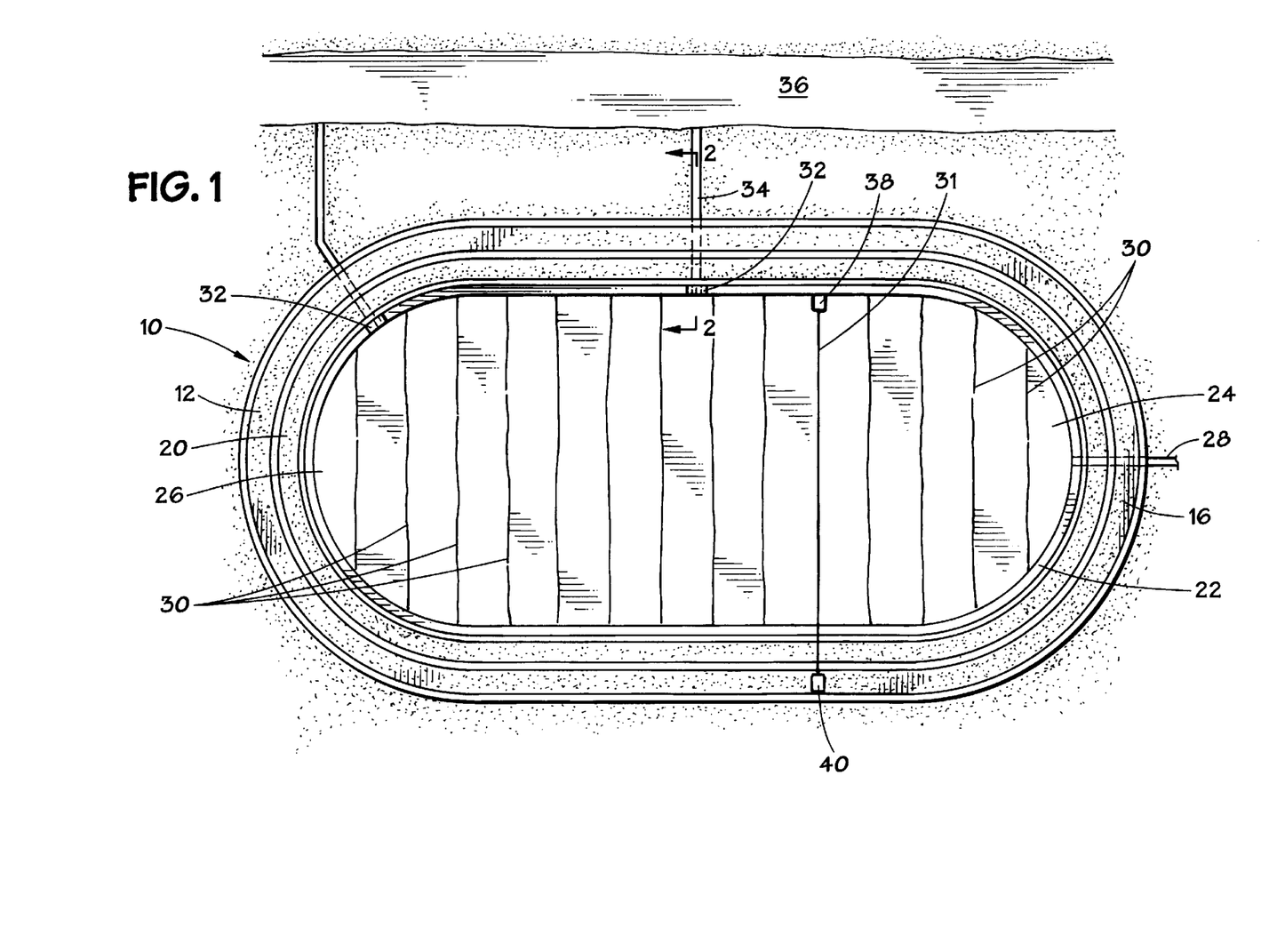
FIG. 1 is a plan view of an exemplary dredge disposal containment area.
Figure 2:
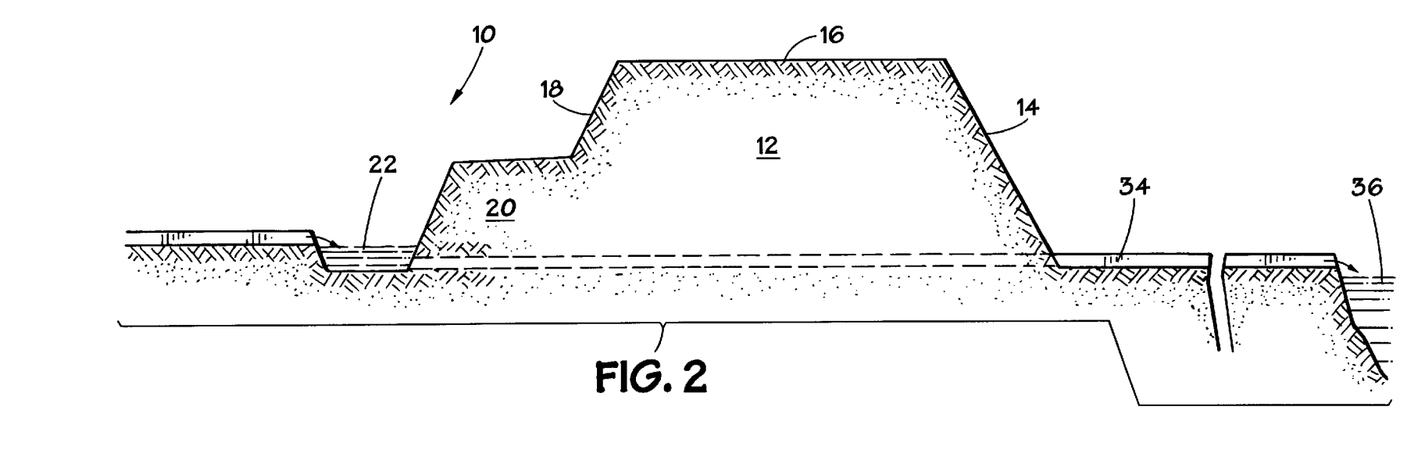
FIG. 2 is a cross-section of a portion of an exemplary containment area taken at plane 2—2 in FIG. 1.

Referring initially to FIGS. 1 and 2, there is shown the disposal area or containment area 10 having a levy 12 extending around its perimeter. Levy 12 includes an outer slope 14, a crown 16, and an inner slope 18 down to a berm 20. Berm 20 also slopes down into the containment area 10. A perimeter ditch 22 extends around the perimeter of containment area 10 adjacent to berm 20 and levy 12. Typically, one end 24 of containment area 10 is higher than the other end 26. The slope between high end 24 and low end 26 is typically two feet. Spoil, such as sludge, slush, or spent ore, or other waste flows or is pumped through a pipe 28 into high end 24 of containment area 10.

Dewatering and Drying of Spoil in the Containment Area Pit

According to methods of the present invention, a plurality of interior ditches 30 must be dug which extend across the width of containment area 10 which are sloped and extend to the perimeter ditch 22 for dewatering via drainage of the water in the spoil to perimeter ditch 22. Interior ditches 30 extend across containment area 10 at predetermined intervals such as 50 foot centers. One or more weirs 32 are disposed adjacent perimeter ditch 22 for the drainage of water from containment area 10 through a discharge pipe 34 to an adjacent disposal area such as a river 36.

Figure 3:
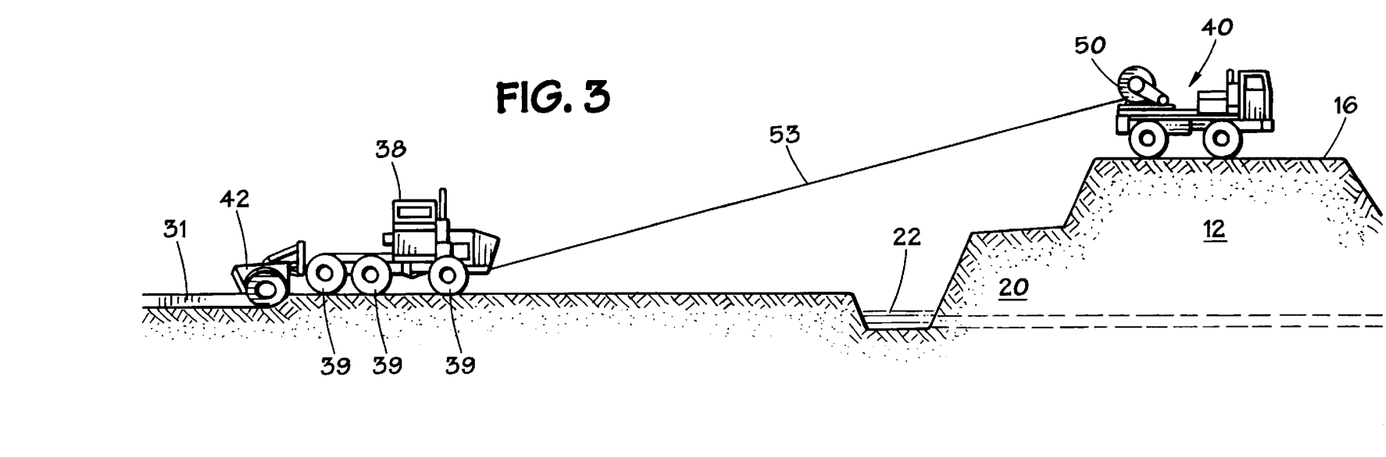
FIG. 3 depicts a digging vehicle within an exemplary containment area tethered by a winch cable to a winch vehicle.

Referring now to FIG. 3, an arrangement is depicted which is useful for accomplishing the digging of ditches within the containment area 10. A digging vehicle 38 is located within the containment area pit 10 adjacent the perimeter ditch 22 to begin digging one of the interior ditches such as ditch 31.

As illustrated in FIG. 3, the digging vehicle 38 should be initially equipped with flotation tires 39 to permit the digging vehicle 38 to substantially float or at least not sink within the spoil of the containment area 10. After spoil within the containment area 10 has been substantially dewatered, however, the containment area 10 will become capable of supporting vehicles which are not equipped with flotation tires. At that point, a tracked crawler vehicle may then be used as the digging vehicle 38.

The digging vehicle 38 is equipped with a rotary ditcher attachment 42 which is capable of being selectively lowered to dig a ditch within the spoil of the pit. Rotary ditcher attachments are available in several standard sizes, such as 3, 5 and 6 foot widths, as needed to construct ditches of various shapes and dimensions. Suitable ditchers are marketed by the Moletti Company of Italy.

There is also shown in FIG. 3 a winch vehicle 40 which carries a positive drive winch 50 which is bolted to the frame of the vehicle 40. It should be appreciated that although the positive drive winch 50 is shown mounted on a vehicle, the positive drive winch 50 need not be mounted on a vehicle but could be mounted on a trailer or other support. The winch vehicle 40 may be either wheeled or tracked. Here it is shown as wheeled vehicle which includes a plurality of flotation tires 42 and driven by an engine 44. If necessary, the winch vehicle 40 may, itself, be secured to a bulldozer (not shown) or other more substantial piece of equipment which will serve as an anchor. It is preferred that 9/16 inch winch cable be used to tether the digging vehicle. This cable is sufficiently strong for this purpose, and a larger diameter cable would be physically difficult to handle.

Figure 4:
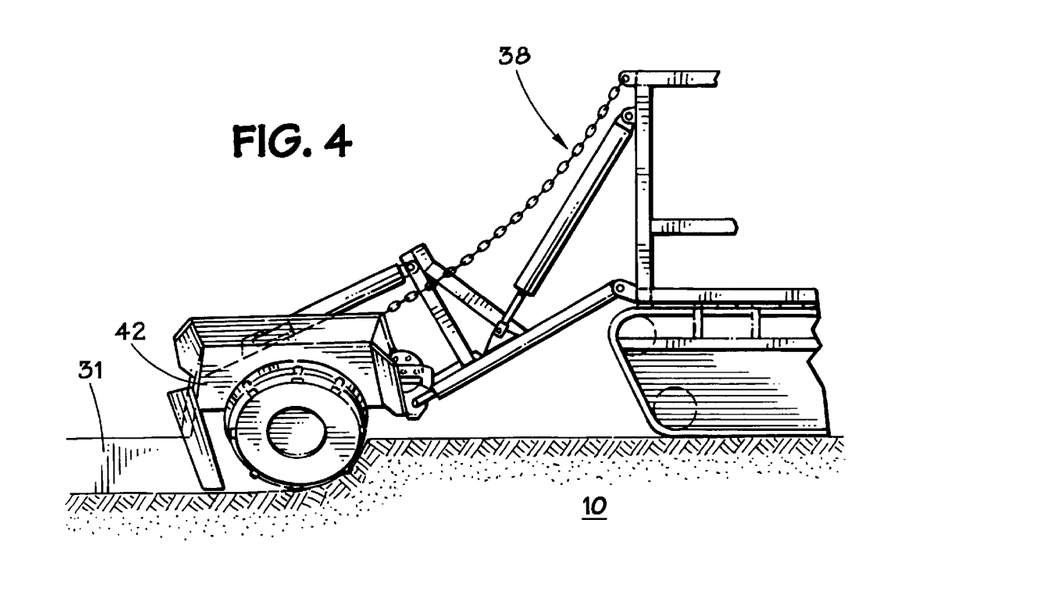
FIGS. 4 and 5 show an exemplary digging vehicle and rotary ditcher attachment arrangement in greater detail.
Figure 5:
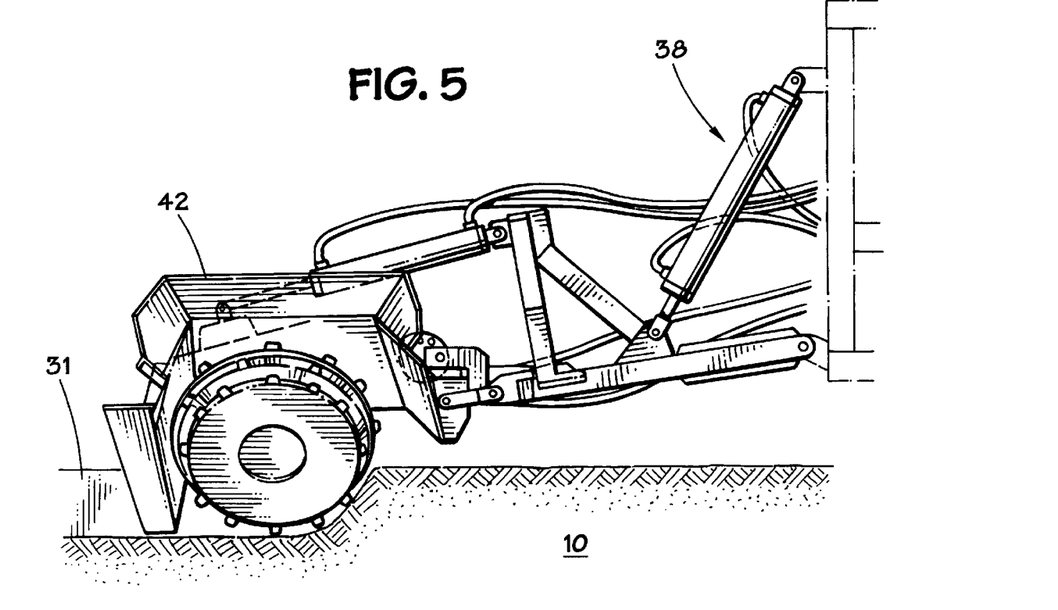
Figure 6:
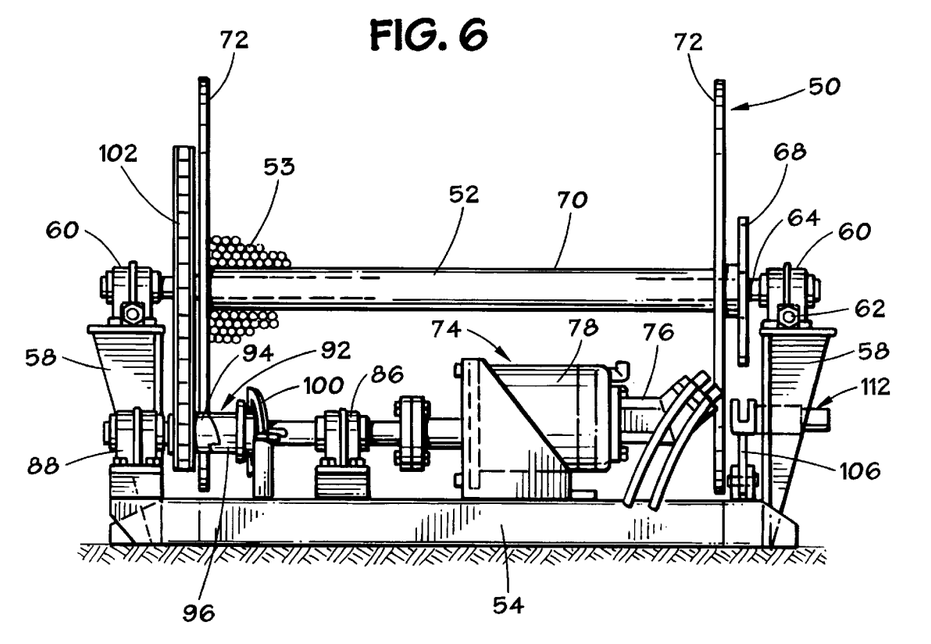
FIGS. 6–9 show an exemplary winch for use in the present invention.

Referring now to FIGS. 6–11, an exemplary positive drive winch 50 is depicted which includes a drum or spool 52 on which is wrapped the steel cable 53. The winch 50 includes a transportable skid or base 54 having bolt holes 56 by which the base 54 may be affixed to a vehicle or other object. Extending upwardly from either lateral side of the base are a pair of vertical side supports 58. Upon each is a pillow block bearing 60 which is adjustably mounted on the support 58 by adjustable mounting bolts 62. It is preferred that the pillow blocks 60 include a bearing which is of high strength. In the described embodiment, the pillow block 60 includes a 3¼" bearing. Through both pillow blocks runs a shaft 64 which carries cable spool 52. The size of shaft 64 is regulated by the size and strength of the cable 53. In the preferred embodiment, the shaft is 3¼" in diameter. It is highly preferred that the cable used be 9/16" in diameter. Also fixedly mounted on the shaft 64 is a toothed spool sprocket 66 and a notched circular plate 68, best shown in FIG. 4. There are preferably at least 3 or 4 notches 68a disposed in the periphery of the plate 68.

The spool 52 includes a spool winding 70 which surrounds the shaft 64. The spool 52 also includes a pair of side plates 72. Preferably, the side plates 72 are 1" in thickness. For a spool capable of carrying 6,000' of cable, a plate which is 3 feet in diameter is suggested. For a spool capable of carrying 12,000' of cable, a 4 foot diameter plate is suggested. The length of the winding 70, measured from side plate to side plate, is preferably approximately 3'.

The winch 50 also includes a drive train assembly 74. The drive train assembly 74 is secured to the base 54 by bolting or other secure connection means. The drive train assembly 74 includes a hydraulic motor 76, which provides high torque and low speed (i.e., low RPM). An example is an 8.2 displacement hydraulic motor of the type manufactured by the Caterpillar, SunStrand, or Dennison companies. In a manner known in the art, the hydraulic motor 32 is operationally interconnected with a hydraulic pump (not shown) and hydraulic tank (not shown) for the supply of hydraulic fluid to the motor 32. These components are normally located on the vehicle upon which the winch is carried and are powered by that vehicle's engine.

Figure 7:
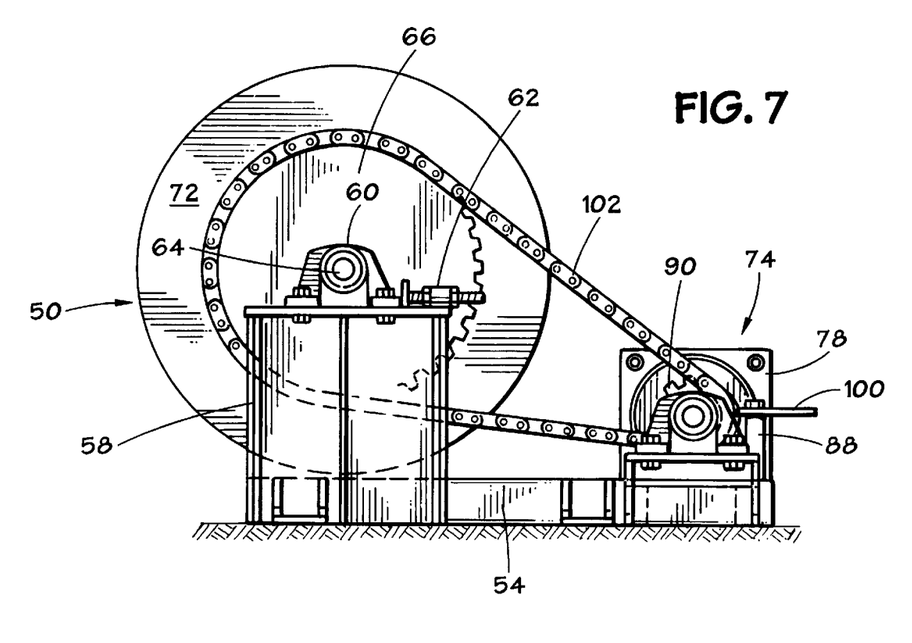
Figure 11:
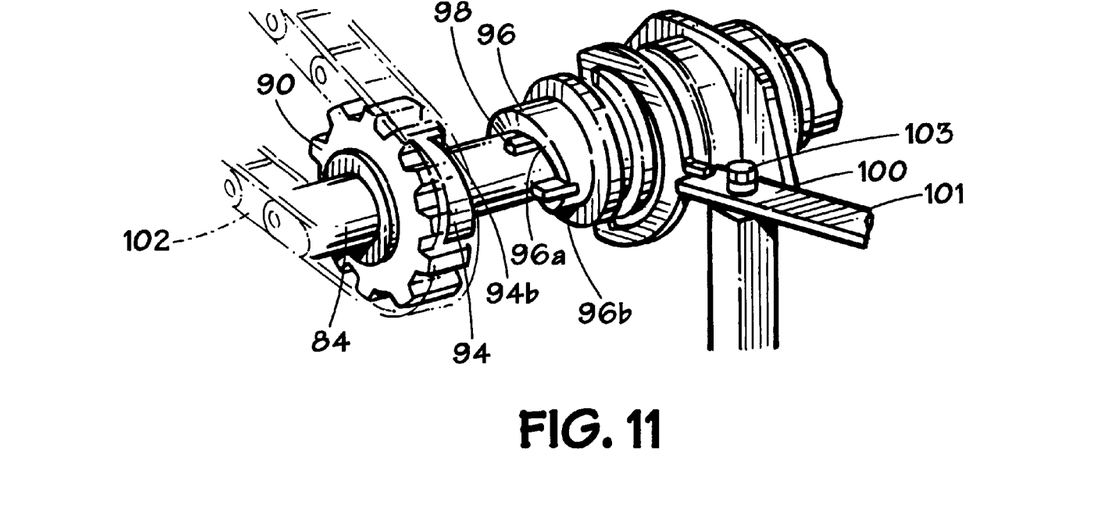
FIG. 11 is a detail showing portions of the exemplary winch of FIGS. 6–9.
Figure 12:
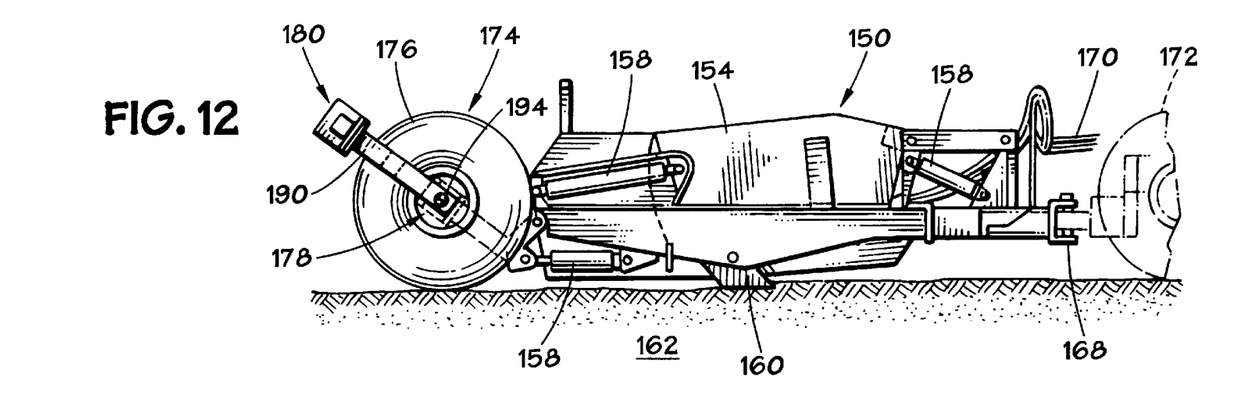
FIGS. 12–17 depict an exemplary amphibious scraper suitable for removal of substantially dried soil.
Figure 13:
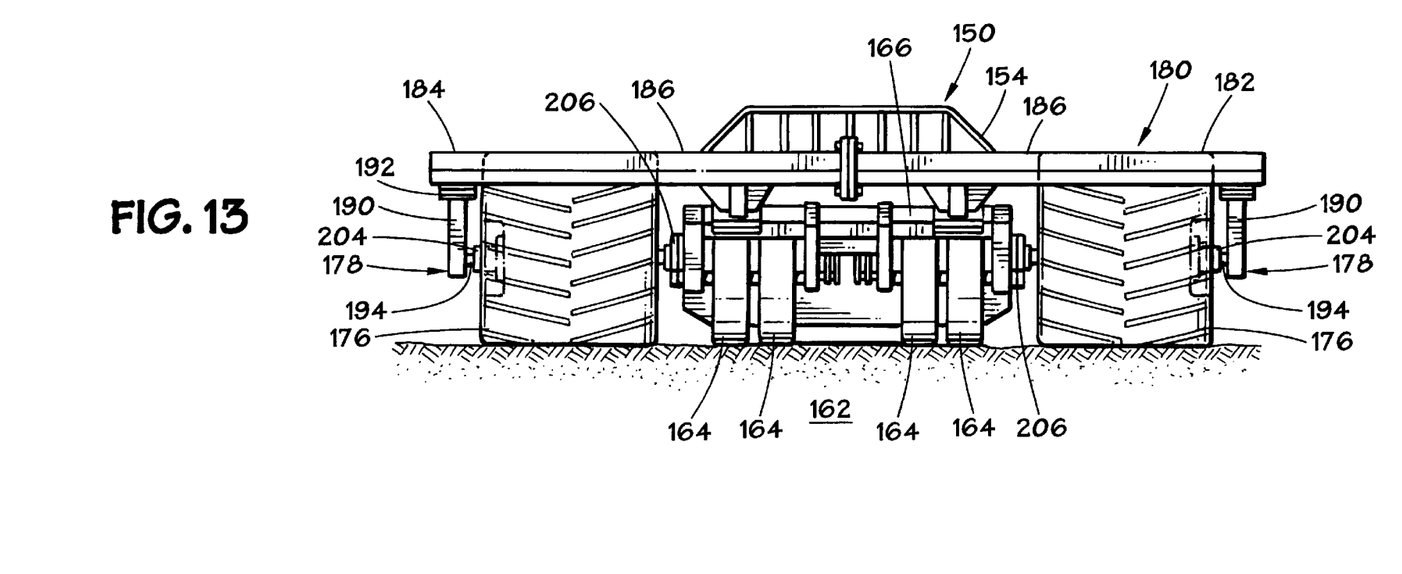

The hydraulic motor 76 is operably interconnected via splines (not shown) with hydraulic gear box 78. A suitable device for use as the gear box 78 is a hydraulic planetary manufactured by Funk Manufacturing of Coffeville, Kans. The gear box 78 serves as a gear reducer. Preferably, the gear box 78 provides for 24:1 gear reduction. Extending from the gear box 78 is an output shaft 80 which is affixed by coupling 82 to drive shaft 84. The drive shaft 84 is mounted proximate base 12 by two high-strength pillow blocks 86 and 88. The drive shaft 84 is preferably of 3" in diameter and formed of 4140 Rockwell hardness steel. Each of the pillow blocks 86, 88 includes a 3" bearing within it. A toothed drive sprocket 90, best shown in FIGS. 7 and 11 is mounted upon the drive shaft 84 for rotation therewith. The drive sprocket 90 is smaller than the spool sprocket 66. In presently preferred embodiments, the spool sprocket 66 has four times as many teeth as drive sprocket 90. A selectively engageable clog or dog assembly 92 is mounted proximate the drive sprocket 90. The dog assembly 92 features a pair of selectively engageable halves 94, 96. The first half 94 is fixedly secured to drive sprocket 90 for rotation therewith. The second half 96 is keyed via a key 98 (See FIG. 11) to the drive shaft 84. The second half 96 may be axially moved between a first position (FIGS. 6 and 8) wherein it will selectively engage with first half 94, and a second position (see FIG. 11) wherein it will not engage first half 94. A yoke 100 is used to move the second half 96 between the first and second positions. The yoke 100 is affixed to the second half 96 and includes an arm 101 which is affixed at a pivot point 103 so that the second half 96 will be moved when the arm 101 is pivoted about point 103.

The yoke 100 may be "thrown" in this manner by either moving the arm 101 manually or by use of a control cable, such as a ½ inch Morris control cable. The engageable portions of each half 94, 96 present angularly tapered surfaces 94a (not visible) and 96a and interengageable shoulders 94b, 96b. When the second half 96 is moved into its first position, the shoulders 94b, 96b should engage each other such that rotation of the drive shaft 84 in the direction to maintain this interlock will cause the drive sprocket 90 to be rotated. Rotation of the drive shaft 84 in the opposite direction will cause the tapered surfaces 94a, 96a to be engaged and the two halves 94, 96 will become disengaged from each other so that the drive sprocket 90 is not rotated.

A drive chain 102 interconnects the drive sprocket 90 and spool sprocket 66 so that the teeth of each sprocket engage links of the drive chain 102. When the drive sprocket 90 is rotated about the drive shaft 84, the spool sprocket 25 is also rotated. The drive chain's connection between the smaller drive sprocket 90 and the larger spool sprocket 66 preferably provides for a 4:1 gear reduction between the drive shaft 84 and the shaft 65 carrying the spool 52. Through combination of the 24:1 gear reduction provided by gear box 78, with that provided by the drive chain 102, a total significant gear reduction of 96:1 is achieved. As a result of this significant gear reduction ratio, the torque generated in rotation of the spool 52 is greatly increased. This increased torque permits a relatively high and constant amount of line pull to be exerted by the winch 50 even after significant amounts of cable have been wound onto the spool 52.

Adjustable mounting bolts 62 allow the pillow block bearings 60 to be adjusted axially, thereby allowing the spool 52 to be adjusted axially with respect to the skid 54 to provide proper tension on the drive chain 102.

Figure 8:
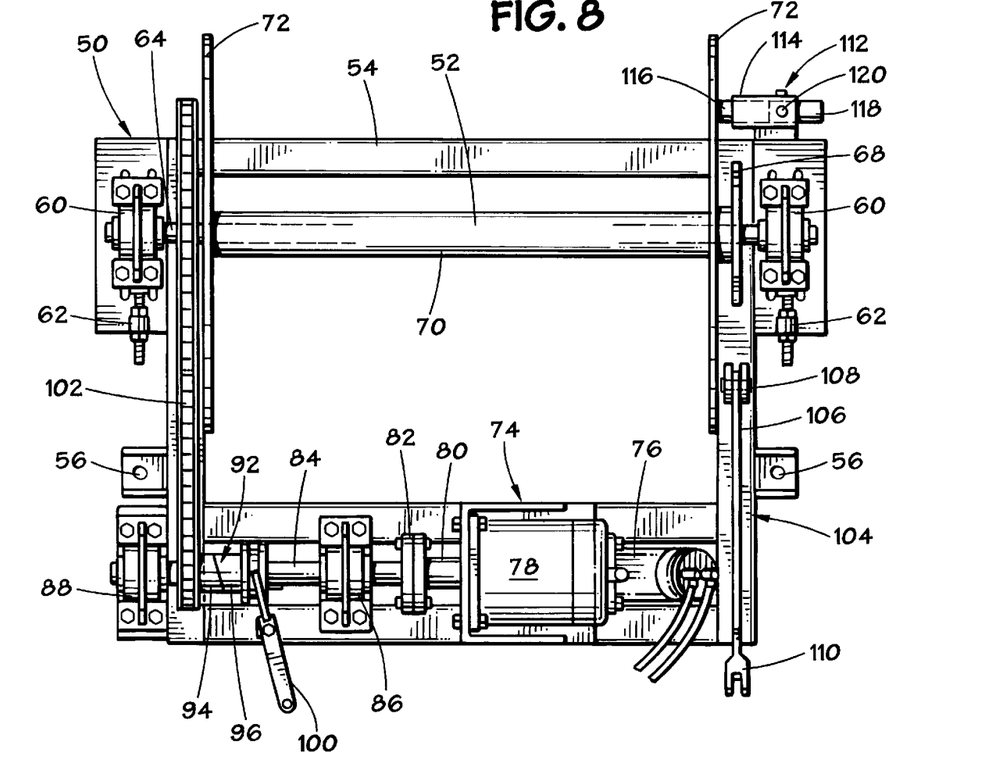
Figure 9:
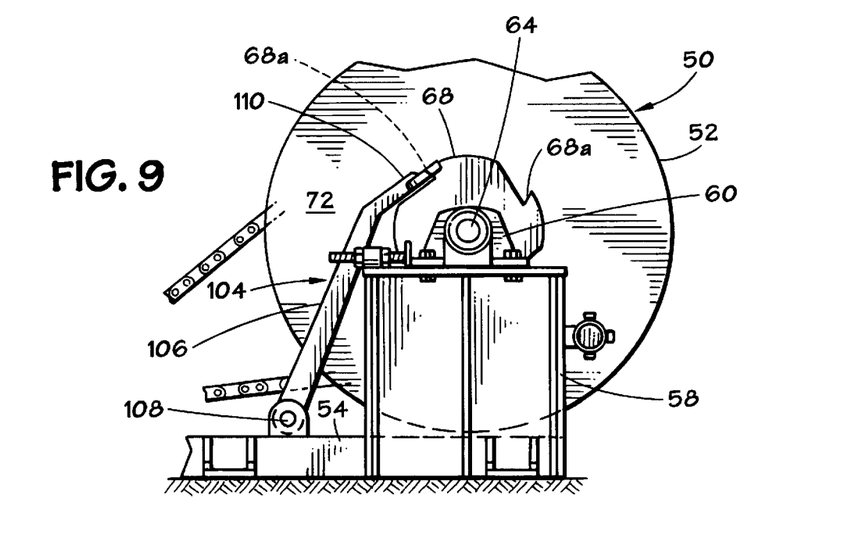
Figure 10:
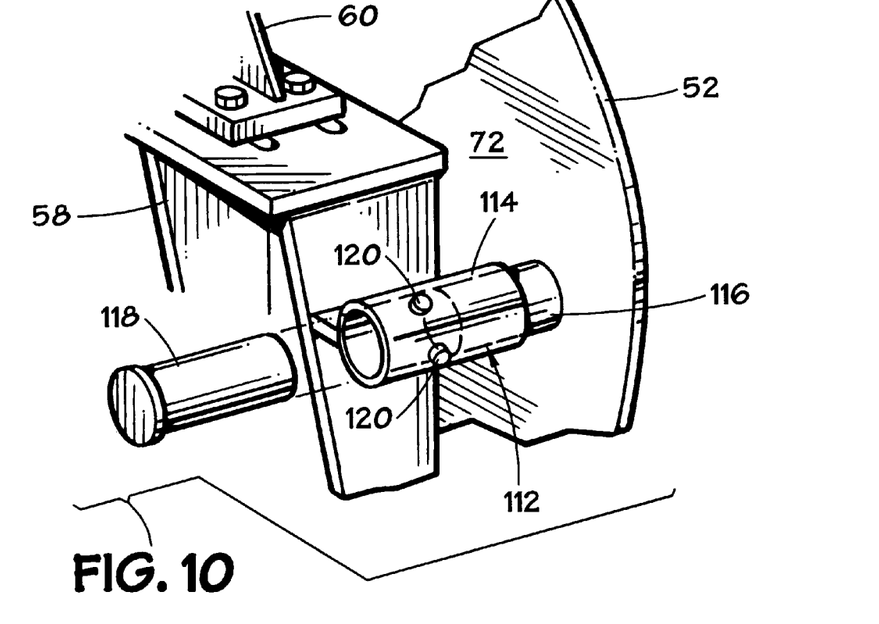
FIG. 10 is an exploded view of an exemplary backlash control assembly incorporated into a winch.

A locking mechanism 104 is also included on winch 52 and is best understood by reference to FIGS. 8 and 9. A lock arm 106 is pivotally connected to the base 54 at pivot joint 108. The end of the lock arm 106 opposite the pivot joint 108 presents a forked engagement portion 110 which is shaped to be generally complimentary to the notches 68a in circular plate 68. The lock arm 106 is pivotally movable between two positions. In the first position, the lock arm 106 is pivoted downwardly away from the circular plate 68 so that its engagement portion 110 is not engaged with the plate 68. When it is desired to engage the locking mechanism 104, the lock arm 106 is pivoted upwardly toward the circular plate 68 and the engagement portion 110 is brought into engagement with a notch 68a in the plate 68. The locking mechanism 104 is useful as a device for stopping rotation of the spool 52 quickly, as in an emergency. The locking mechanism 104 may also be engaged when the spool 52 is not moving and it is desired to prevent it from doing so. The locking mechanism 104 only prevents rotation of the spool 52 in one direction. The feature is useful in situations where, for example, the winch operator desires to prevent further payout of cable, but permit the spool to be rotated to wind cable. During the winching operation, the locking mechanism 104 is not engaged.

A backlash control assembly 120 is also included on the winch 10. It is best shown in FIG. 8 and, in an exploded view, in FIG. 10. The backlash control assembly 112 includes a hollow tube 114 which is fixedly mounted on vertical support 58. A cylindrical Teflon® drag member 116 and a second cylindrical member 118, formed of metallic or another rigid material, are disposed within the hollow tube 114. Finally, one or more bolts 120 are disposed through the walls of the tube 114. The backlash control is employed by inserting the drag member 116 into the tube 114 such that it contacts a side plate 72 of spool 52. The second cylindrical member 118 is then also inserted into the tube 114 behind the drag member 116 and the bolts 120 tightened against the second member 118. This arrangement then maintains the drag member 116 in frictional engagement with the side plate 72 of spool 52. This frictional engagement resists rotation of the spool 52 and prevents it from rotating too quickly as would occur if the winch cable were to break causing a backlash.

Hydraulic tank 106 has a hydraulic control line 109 extending to hydraulic motor 94. The hydraulic system includes a pump which furnishes the hydraulic oil to the hydraulic motor 94. Another hose is connected to the suction end of the pump. The hydraulic line from the tank 106 is connected to the hydraulic pump and then there is line connecting the hydraulic pump to the hydraulic motor 94. The hydraulic oil for hydraulic motor 94 is filtered by a filter 110.

The winch speed used to pull the digging vehicle 38 should be very slow because the digging vehicle 38 moves at a very slow speed to allow time for the ditcher 42 to dig the ditch. A range of preferred speeds for the digging vehicle 38 is between approximately ¼ mph and ½ mph. The speed of the winch 50 can be regulated by changing the sizes of sprockets 66 and/or 90 through changes in the amount of reduction of speed caused by gear box 78. In the embodiment described herein, there is a 96:1 reduction overall. Further, the speed can be regulated through the transmission of the winch vehicle 40. A five speed transmission turns the hydraulic pump. With a positive drive winch, there will be sufficient line pull to move the digging vehicle 38 even after numerous wraps of cable 53 about the spool 52.

According to the present invention, the winch cable 53 is affixed to the digging vehicle 38 to tether the digging vehicle 38 to the winch vehicle 40. The winch vehicle 40 is positioned on the berm or levy 12 while the tethered digging vehicle 38 is positioned within the dredge pit 10 typically at a position across the pit 10 from the winch vehicle 40 such that the ditching vehicle 38 may be pulled to move in a line along which it is desired to construct a ditch for dewatering of dredge spoil. The cable 53 may be freespooled out to the necessary length to allow the vehicles to be positioned in this manner.

The rotary ditcher 42 attached to the digging machine 38 is then started to begin digging within the spoil of pit 10. Although the flotation tires 39 on the digging machine 38 permit the digging machine 38 to stay afloat in the spoil, they do not permit adequate traction for the digging machine 38 and ditcher 42 to move across the pit 10 unassisted. The winch 50 will pull the digging machine 38 across the pit 10 in order that ditch 31 is created across the pit 10 to the perimeter ditch 22. When completed, the ditch 31 will remove surface water to the perimeter ditch 22 and promote the formation of cracks within the spoil which will expose more surface area to natural evaporation drying processes.

Once evaporation and shrinkage of the spoil has reached the point where the dredge spoil has dried to the bottom of the ditch 31, subsequent ditching passes should be made generally along the same ditch line to create a progressively deeper ditch. It is suggested that larger rotary ditcher attachments, such as 5 or 6 foot width attachments, be used in subsequent passes to enlarge the ditch. Further drying and dewatering will occur with each ditching pass. Eventually, the spoil surrounding the ditches will become entirely substantially dried. Experience has shown that the digging machine 38 will need to be winched across the pit 10 for the first three ditching passes, although this number may be more or less depending upon the conditions of the specific containment area being worked on.

Preferably, a number of substantially parallel ditches (30 in FIG. 1) will be constructed in this manner across substantially the entire surface of the pit 10 in order to dewater all of the spoil at the surface of the pit 10. Normally, the pit spoil will dry adequately as a result of the dewatering described above to be removed from the pit. If desired, however, as the pit spoil is dewatered, drying may be assisted through further aeration of the spoil. This might be accomplished using methods known in the art for such aeration such as, for example, using a soft terrain vehicle with a disk kit to "disk" the spoil.

Removal of Dried Pit Spoil

Once the dredge spoil has been substantially dried to a depth in the range of three feet, the dried spoil must be removed from the containment area 10 so as to dry new wet spoil. This avoids the containment area 10 from being used up. The dry spoil is often placed on the crown 16 of the levy 12 or on the berm 20.

One method of removing dried material is with use of a scraper pan. A scraper pan collects dried spoil into an interior bin to later be unloaded outside the containment area 10 such as on the levy 12 or berm 20. An amphibious scraper with pan suitable for working in a containment area environment is described in U.S. Ser. No. 08/708,549, entitled "Amphibious Scraper," assigned to the present assignee and incorporated herein by reference. Typically, a pan is pulled behind a vehicle for the removal of dirt and transporting it to another location. There are many different brands of pans and scrapers on the market. One such brand is manufactured by Rome Mfg. Co. of Cedart Town, Ga.

Conventional scraper pans have the disadvantage of being unable to operate on low ground pressure such as in containment areas. The conventional pan includes street tires to support the pan. Such tires are of little value when operated on low ground pressure.

Referring now to FIGS. 12–17, there is shown an exemplary amphibious scraper 150 is shown of the type which is towed behind a prime mover 152 in operation. A suitable prime mover 150 is a Rolligon, manufactured and sold by Rolligon Corporation, 10635 Brighton Lane, Stafford, Tex. 77477, (713)495-1140. The scraper 150 includes a pan 154 with an interior bin 16 (best seen in FIG. 14) for storage of earth. One type of conventional commercial pan useful for modification in accordance with the present invention is an 11 cubic yard scraper pan manufactured by Rome Mfg. Co. Hydraulic assemblies 18 can selectively raise or lower the pan 154. The lower opening (not shown) includes a forwardly-directed blade 160 which comes into contact with the ground surface 162 when the pan 154 is lowered. The opening is opened for receipt of earth when the pan 154 is lowered and is moved into a closed position when the pan 154 is raised. Such opening and closing operations are, of course, well known and need not be described in detail here.

The scraper 150 features a conventional wheel assembly with land-capable wheels 164. A cross-piece 166 extends across the upper portion of the conventional wheels 164. Use of conventional wheel assemblies with such components is well known.

Figure 15:
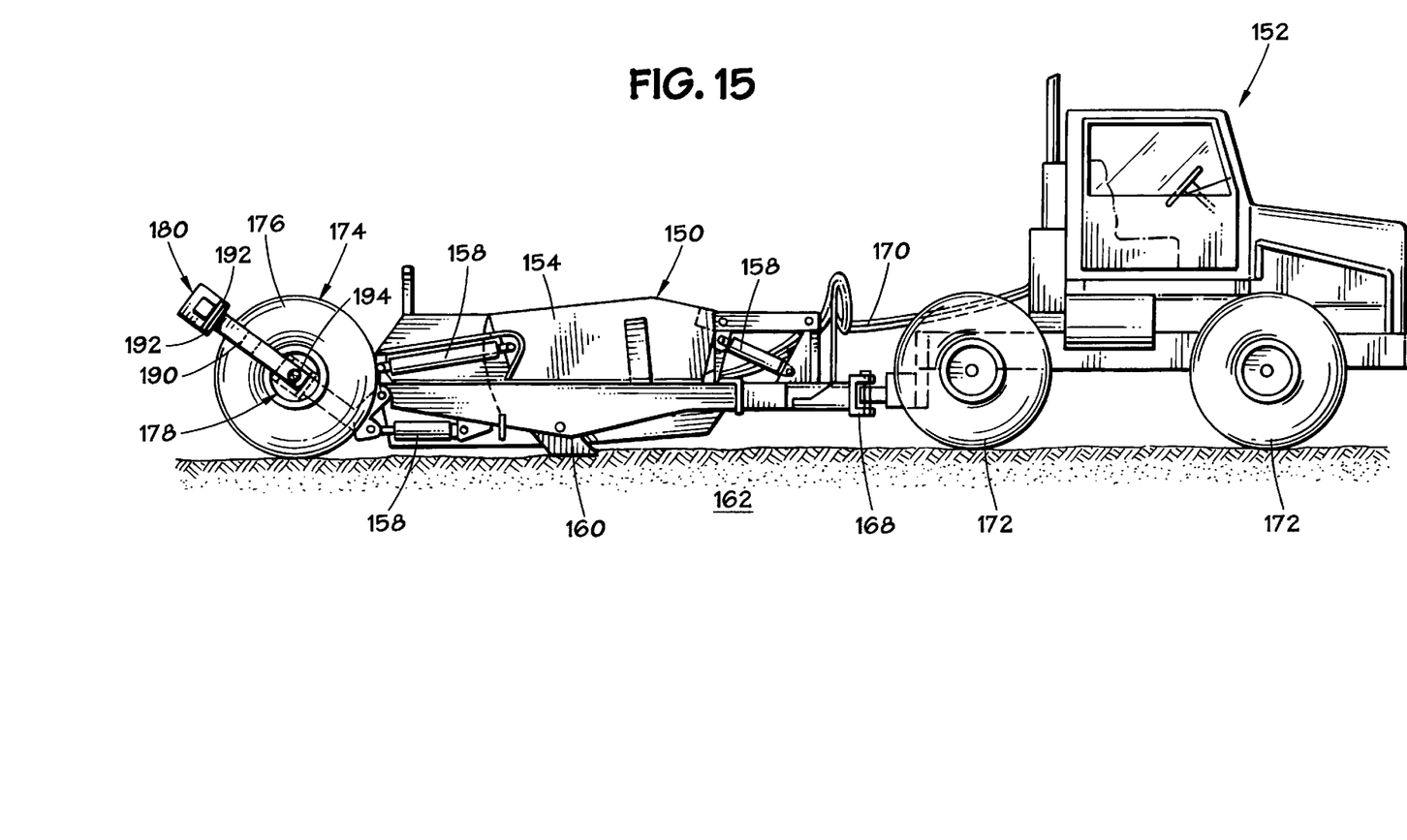

As FIG. 15 illustrates, the scraper 150 also includes a towing hitch 168 by which it can be affixed to the prime mover 152 for towing. Hydraulic lines 170 extend from the prime mover 152 to the scraper 150 to supply hydraulic fluid to assemblies 158. It is noted that the prime mover 152 is preferably equipped with flotation tires 172.

A demountable flotation tire assembly 174 is shown in place on the scraper 150. The flotation tire assembly 174 includes a pair of surface engaging flotation tires 176. The flotation tires 176 are of a low pressure, balloon tire variety known in the art. The flotation tires 176 are affixed to the scraper 150 by an axle extension assembly 178 and a support bracket assembly 180.

Figure 16:
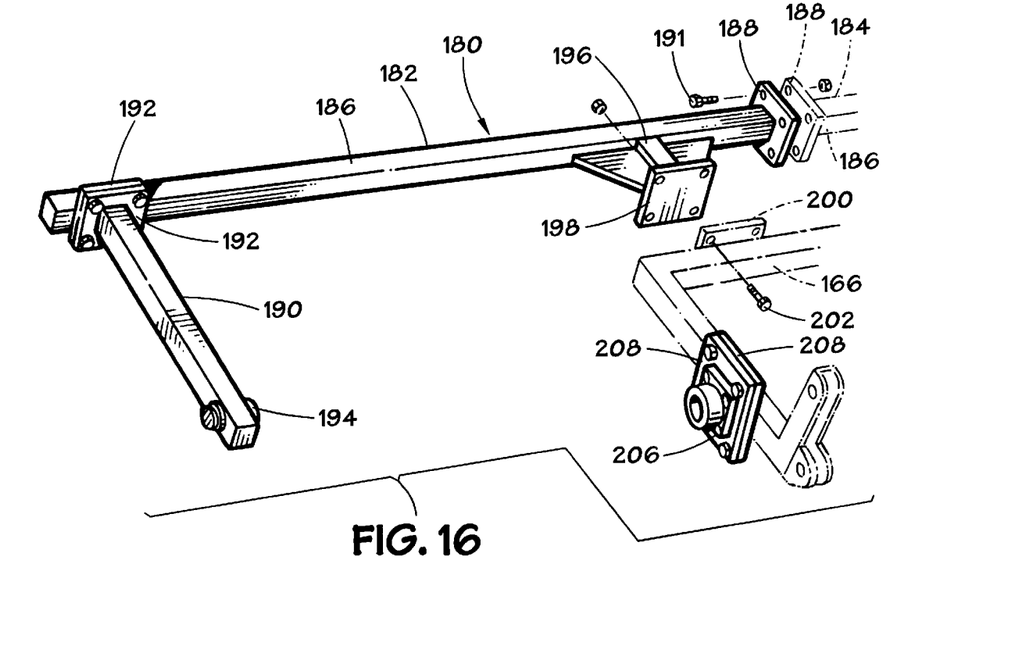

The support bracket assembly 180 helps maintain affixation of the flotation tires 176 to the scraper 150 and is preferably fashioned from a pair of removable L-shaped bracket sections 182, 184, the construction of which is best seen in FIG. 16. Each bracket section 182, 184 includes a horizontal support member 186 having a connecting bolt plate 188 welded or otherwise fixedly connected to the inboard end of the support member 186. The horizontal members 186 are also each affixed at their opposite ends to a lateral brace member 190 which extends from the horizontal member 186 to the axle extension assembly 178 for each flotation tires 176. The horizontal members 186 and lateral members 190 are preferably affixed together using are pair of connecting bolt plates 192 which are similar to the bolt plates 188 described previously. At its opposite end, the lateral members 190 have a horizontally disposed shaft 194 disposed therethrough. The two bracket sections 182, 184 are reversably connectable by affixing the bolt plates 188 of each section using connectors such as suitable bolt and nut assemblies 191 (see FIG. 16). When the bracket assembly 180 is fashioned from a number of removable bracket sections, such as bracket halves 182, 184, the entire bracket assembly 180 may be readily removed from the scraper 150 so that the scraper 150 and the components of bracket assembly 180 may be transported on a low boy or other transporter without exceeding the roadway width. The bracket assembly 180 may also be removed when the flotation tire assembly 174 is unnecessary, such as when the scraper is operating in areas which are not swampy or marshy.

The horizontal members 186 each include a lateral connection piece 196 through which the support bracket assembly 180 is fixedly connected to the cross-piece 166 of scraper 150. Preferably, another pair of connecting bolt plates 198, 200 are used to affix the connection piece 196 to the cross-piece 166. One plate 198 is welded to the connection piece 196 while the other plate 200 is welded to the cross piece 166. Bolt and nut connectors 202 are used to interconnect the two plates 198, 200.

Each of the two flotation tires 176 is maintained in rolling engagement with the surface by an axle extension assembly 178. The axle extension assemblies 178 are each made up of two portions: an inner bearing assembly 204 and an outer bearing assembly 620. The inner and outer bearing assemblies 204, 206 are similar to each other in construction. Each functions to help maintain the flotation tires in alignment with the scraper 150 for rotation and surface engagement.

Figure 14:
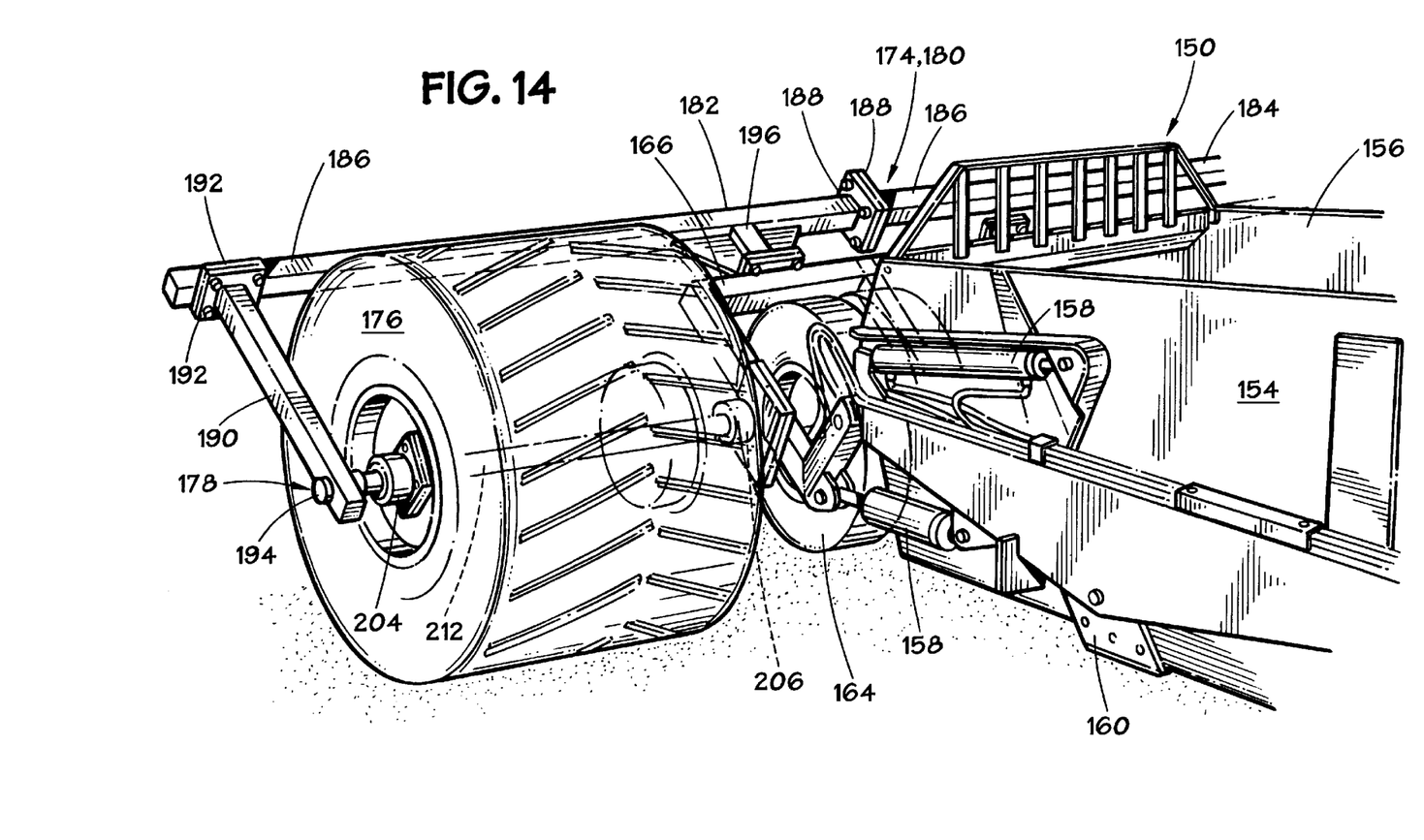

The inner bearing assemblies 204 are affixed to the cross-piece 166 (as shown in FIGS. 14 and 16) by welding or other means of creating a secure connection. Details of the inner bearing assemblies 206 are best understood by reference to the exploded view of FIG. 17. Bearings for use in bearing assemblies of this type may be obtained from numerous commercial bearing vendors including Rexnord Corporation and Motion Industries. The Rex bearing from Rexnord Corporation is an example of a suitable bearing for this application.

Figure 17:
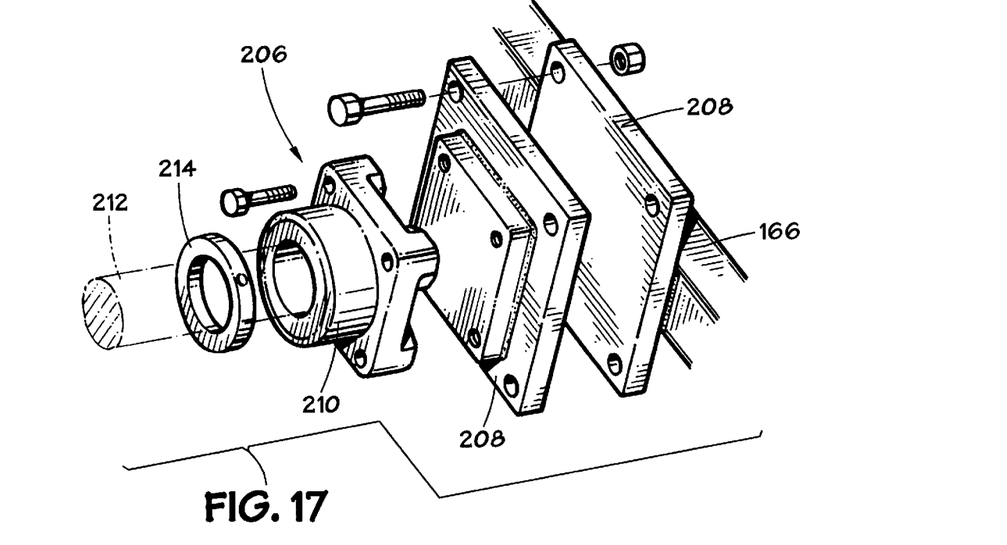

A pair of connecting bolt plates 208 are used to affix the bearing assembly 206 to the cross-piece 166 in the manner described for previous plate arrangements. An axle bearing 210 is then secured to the outermost bolt plate 208. A collar 214 is used to secure an axle shaft 212 within the bearing 210. In a similar manner, the outer bearing assembly 204 is secured to the outboard shaft 194.

The low ground pressure scraper pan 150 may be used in the soft containment area 10 to allow the pan to remove the dried crust in the containment area.

In operation, the digging vehicle 38 is located adjacent the perimeter ditch 22 to begin digging one of the interior ditches such as ditch 31. The free end of the cable 54 is attached to the front end of the digging vehicle 38 and the power drive winch vehicle 40 is driven on top of the crown of the levy 12 with the cable unspooling from spool 52. The plastic drag 68 prevents the cable 54 from unspooling too fast. The power drive winch vehicle 40 is then driven and aligned to a point directly across the containment area from the digging vehicle 38. The power drive winch vehicle is either on the crown of the levy 12 or may be on the berm 20 depending upon the ground pressure afforded by the berm.

The control cable 109 is activated to shift the male section 112 into engagement with female section 114 of knuckle clog 102. This begins the rotation of spool 52 and the wrapping of cable 54 onto the spool 52. Typically the cable 54 is manually guided onto the spool 52 as it is spooled up. This is achieved by a workman using a guide bar to cause the cable 54 to wrap evenly in wraps about the spool 52.

After the slack in the cable 54 has been spooled onto spool 52, the digging vehicle 38 is slowly winched across the containment area 10 with a slow, steady constant movement. Both the digging vehicle and winch vehicle 40 operators have radios allowing them to communicate and control the winching speed and thus the speed of the digging vehicle 38. The speed of the digging vehicle 38 depends upon the consistency of the spoil through which the interior ditch 31 is being dug. If the spoil is very soft, the ditch can be cut faster than on a second or third pass along the ditch. When the spoil has crusted, it is necessary for the digging vehicle 38 to have a slower speed.

The speed must be adequate to allow the digging vehicle 38 to dig an appropriate interior ditch 31. Typically, the interior ditch is six feet wide although often the net ditch is only a foot or so wide the first time the interior ditch is dug. The spoil tends to run back into the ditch causing the net width of the ditch to be less than the original width which was dug by the digging vehicle.

This process is repeated until all of the interior ditches 30 are dug across containment area 10. Typically, after all of the interior ditches 30 of one containment area have been dug, the equipment, 38, 40 is taken to another containment area to re-dig the interior ditches of that containment area while the spoil in the first containment area is allowed to dry and crust over.

After the interior ditch 31 is dug, the water tends to run down the interior ditches 30 and into the perimeter ditch 22. The first pass in digging an interior ditch typically only allows the surface water to run down the interior ditch into the peripheral ditch 22. The spoil is then allowed to dry and crust over. This process typically takes several weeks. After the interior ditches 30 have crusted over, the interior ditches 30 are dug again. The interior ditches 30 are continually worked over as this process is repeated.

After the spoil in a particular containment area has dried to a predetermined depth, the pan 120 may be used to remove the dried spoil and relocate it such as on the levy 12 or berm 20.

While preferred embodiments of the invention have been shown and described, modifications thereof can be made by one skilled in the art without departing from the spirit of the invention.

What is claimed is:

1. A process of dewatering dredge spoil in a dredge disposal area containment area by removal of water from the dredge disposal area, the process comprising:
   a. affixing a winch cable to a ditching vehicle as a tether;
   b. placing said ditching vehicle on dredge spoil within the containment area; and
   c. operating said ditching vehicle to dig within the dredge spoil;
   d. substantially assisting movement of the ditching vehicle across portions of the containment area through winching of said winch cable by a winch so that a ditch is constructed;
   e. substantially draining entrapped water from the dredge spoil into the ditch such that portions of the dredge spoil become substantially dry;
   f. removing said substantially dried dredge spoil from the containment area; and
   g. placing the removed substantially dried dredge spoil upon a levy.

2. The process of claim 1 wherein assisted movement of the ditching vehicle causes a plurality of substantially parallel, spaced ditches to be constructed within the dredge spoil.

3. The process of claim 1 wherein additional ditching passes of the ditching vehicle are made.

4. The process of claim 1 wherein the substantially dried dredge soil is removed by scraping with an amphibious scraper.

5. A process for maintaining a disposal area by removing water from spoil contained within the disposal area, comprising:
   a. operating a self-propelled ditcher within a disposal area to dig within spoil contained in said area;
   b. affixing said ditcher to a winch;
   c. operating the winch to assist said ditcher across a portion of said disposal area so that a first ditch is dug by said ditcher;
   d. constructing a second ditch within said area;
   e. allowing water from said spoil to be transmitted along said first and second ditches to a perimeter ditch so that portions of the spoil are dried; and
   f. removing the dried portions of the spoil from the disposal area.

6. The process of claim 5 wherein said ditching machine is assisted along a line in which it is desired to construct a first ditch.

7. The process of claim 5 further comprising assisting said ditcher along said line in a subsequent ditching pass to enlarge said first ditch.

8. The process of claim 5 further comprising aerating the spoil.

9. The process of claim 5 wherein removing the dried portions of spoil comprises towing an earth-receiving pan within the disposal area so that said dried portions of spoil are received within the pan.

10. The process of claim 9 wherein the pan is towed by an amphibious scraper.

11. The process of claim 5 further comprising depositing said dried portions of spoil upon a levy surrounding said disposal area.

12. The process of claim 5 wherein the first and second ditches are substantially parallel.

* * * * *